United States Patent
Gaspar et al.

(10) Patent No.: US 10,215,318 B2
(45) Date of Patent: Feb. 26, 2019

(54) BREECH LOCK COUPLING

(71) Applicant: GATES CORPORATION, Denver, CO (US)

(72) Inventors: Andras Gaspar, Szeged (HU); Norbert Reichenberger, Szeged (HU)

(73) Assignee: Gates Corporation, Denver, CO (US)

(*) Notice: Subject to any disclaimer, the term of this patent is extended or adjusted under 35 U.S.C. 154(b) by 259 days.

(21) Appl. No.: 15/221,302

(22) Filed: Jul. 27, 2016

(65) Prior Publication Data

US 2018/0031158 A1 Feb. 1, 2018

(51) Int. Cl.
| F16L 33/207 | (2006.01) |
| F16L 33/22 | (2006.01) |
| F16L 37/252 | (2006.01) |
| F16L 25/00 | (2006.01) |
| F16L 25/08 | (2006.01) |

(52) U.S. Cl.
CPC .......... *F16L 33/225* (2013.01); *F16L 25/009* (2013.01); *F16L 33/2073* (2013.01); *F16L 33/2075* (2013.01); *F16L 33/2076* (2013.01); *F16L 37/252* (2013.01); *F16L 25/08* (2013.01)

(58) Field of Classification Search
CPC ............... F16L 33/2071; F16L 33/2073; F16L 33/2076; F16L 33/2078
USPC .................................................. 285/256, 391
See application file for complete search history.

(56) References Cited

U.S. PATENT DOCUMENTS

| 1,470,209 | A | * | 10/1923 | White | ................. | F16L 37/105 |
| | | | | | | 285/391 |
| 3,237,974 | A | * | 3/1966 | Press | ................. | F16L 33/2073 |
| | | | | | | 285/256 |
| 3,442,537 | A | * | 5/1969 | Mack | ................. | F16L 33/207 |
| | | | | | | 285/256 |
| 3,480,302 | A | | 11/1969 | Jeffery et al. | | |
| 3,630,548 | A | * | 12/1971 | Kimm | ................. | F16L 33/2073 |
| | | | | | | 285/247 |
| 3,999,604 | A | | 12/1976 | Amancharia et al. | | |
| 4,366,816 | A | | 1/1983 | Bayard et al. | | |
| 4,552,427 | A | | 11/1985 | Landgreen | | |

(Continued)

FOREIGN PATENT DOCUMENTS

| CA | 2863872 A1 * | 3/2015 | .......... F16L 33/2071 |
| GB | 2294516 A | 5/1996 | |
| JP | 04296286 A * | 10/1992 | .......... F16L 33/2071 |

OTHER PUBLICATIONS

European Patent Office, International Search Report and Written Opinion application No. PCT/US2017/043905, dated Oct. 11, 2017.

*Primary Examiner* — David Bochna
(74) *Attorney, Agent, or Firm* — Jeffrey A. Thurnau, Esq.; Paul N. Dunlap, Esq.

(57) ABSTRACT

A breech lock coupling comprising a stem receivable in a hose, a ferrule configured to receive the stem and hose, a connector, the ferrule comprising a plurality of ferrule lugs on an inner surface, each ferrule lug separated from an adjacent ferrule lug by a ferrule lug gap, the connector comprising a plurality of connector lugs on an outer surface, each connector lug separated from an adjacent connector lug by a connector lug gap, each ferrule lug gap arranged to receive a connector lug and each connector lug gap arranged to receive a ferrule lug upon engagement of the ferrule with the connector, each connector lug axially alignable with a ferrule lug upon rotation (R) of the connector within the ferrule, the connector engages a stem end, a fastener for fixing a connector position relative to the ferrule.

20 Claims, 4 Drawing Sheets

(56) References Cited

U.S. PATENT DOCUMENTS

| | | | | |
|---|---|---|---|---|
| 4,564,223 | A | * | 1/1986 | Burrington ......... F16L 33/2078 |
| | | | | 285/256 |
| 4,893,426 | A | | 1/1990 | Bixler |
| 6,318,763 | B1 | * | 11/2001 | Huang ................ F16L 33/2078 |
| | | | | 285/256 |
| 6,860,525 | B2 | | 3/2005 | Parks |
| 7,338,090 | B2 | | 3/2008 | Baldwin et al. |
| 8,763,708 | B2 | | 7/2014 | Travis et al. |
| 9,267,335 | B2 | | 2/2016 | Walker et al. |
| 2007/0079885 | A1 | * | 4/2007 | Zaborszki ............... F16L 33/01 |
| | | | | 285/256 |
| 2013/0015656 | A1 | | 1/2013 | Ehrke et al. |
| 2015/0292661 | A1 | * | 10/2015 | Gilbreath ............ F16L 33/2073 |
| | | | | 285/355 |

* cited by examiner

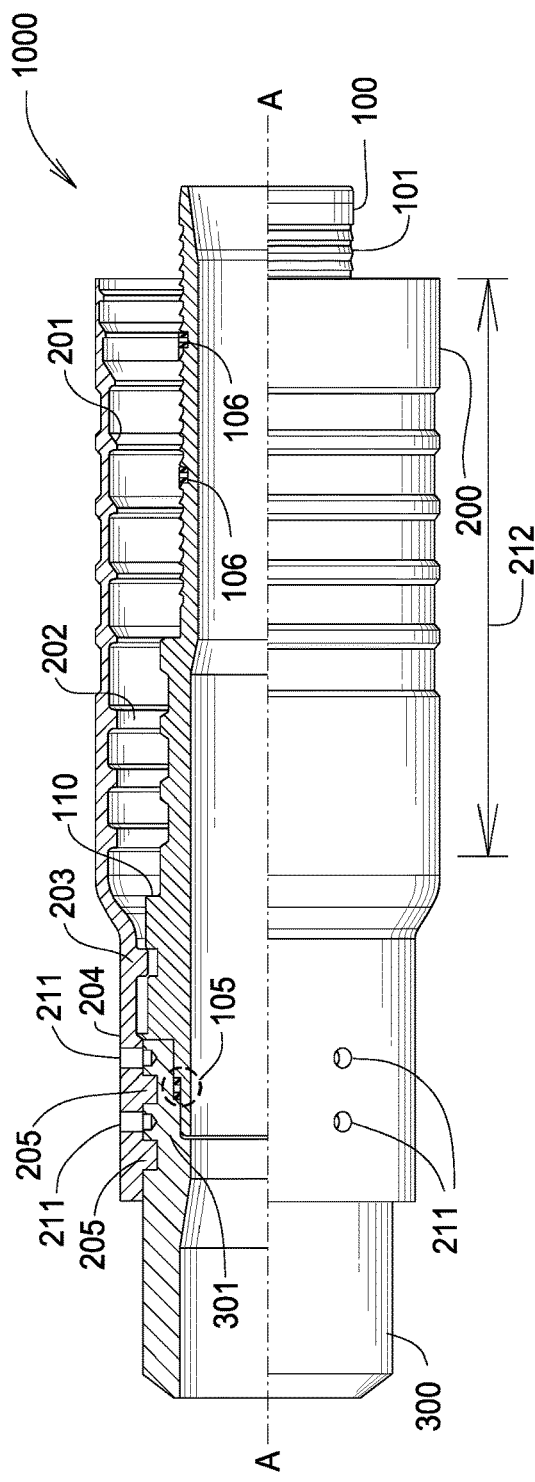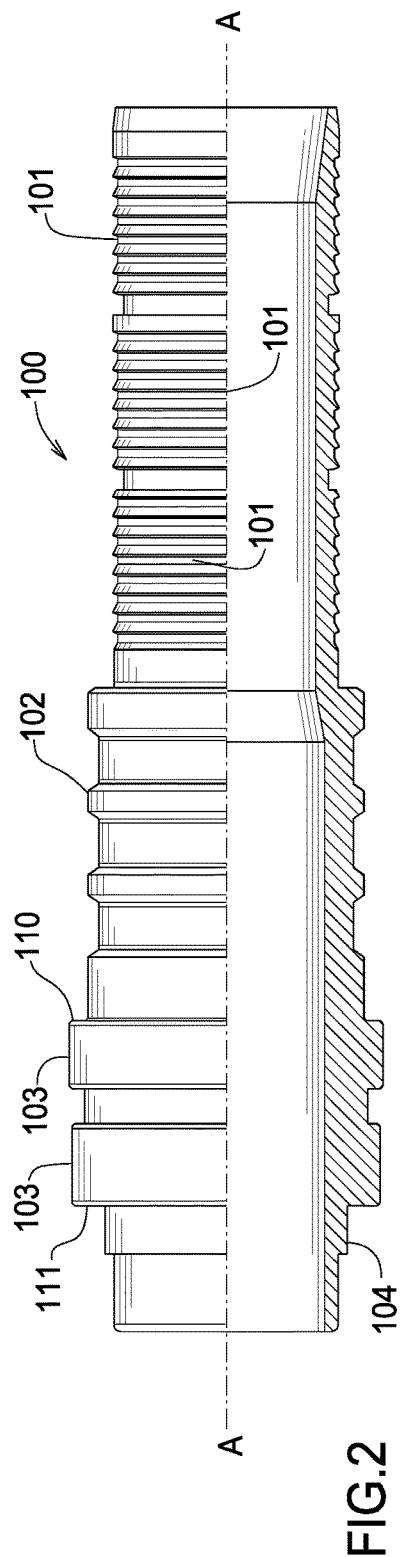

BREECH LOCK COUPLING

FIELD OF THE INVENTION

The invention relates to a breech lock coupling, and more particularly, to a breech lock coupling comprising a ferrule locking to a connector with a breech lock connection, and the ferrule locking directly to a stem by crimping or swaging the ferrule to the stem.

BACKGROUND OF THE INVENTION

Flexible high pressure hoses typically comprise a rubber polymeric tube and are reinforced using multiple layers of "close wound", high tensile plated steel cables (or wire rope) to withstand flexing and high pressures encountered in oil field and offshore operations for example. This cable reinforcement is typically wire stranded rope. Such hoses also typically include multiple layers of fabric reinforcement disposed under the hose cover, which may be a modified nitrile resistant to abrasion, corrosion, cutting, gouging, oil and weather.

Prior crimped or swaged couplings typically employ a ridged ferrule and barbed stem fitting. The ferrule and stem are typically either welded or stacked together leaving an opening which accepts hose. For example, see Baldwin, et al., U.S. Pat. No. 7,338,090, which employs a "waved" ferrule and stem that joins an end connector. This ferrule and stem are welded together at the coupling end, leaving an opening, which accepts the reinforced hose. The stem is designed to support the hose which is inserted over it and under the ferrule. The ferrule is swaged or crimped down onto the hose to provide compressive forces, sealing the hose against the stem and retaining the hose in the coupling.

For use with this sort of coupling the cover of the hose is skived so that the ferrule is able to press down on the cable reinforcement, directly, without the need to penetrate the rubber cover.

Other approaches to retaining a fitting on a cable reinforced hose call for unraveling reinforcement cable extending from an end of the hose and welding individual elements (cables) to a coupling.

Breech lock fittings are used where a positive mechanical connection is required. Breech lock fittings typically comprise cooperating lugs that form a positive mechanical link upon insertion and rotation of the cooperating parts.

Representative of the art is U.S. Pat. No. 9,267,335 which discloses a breech lock coupling for coupling riser sections together. The breech lock coupling may be used non-preloaded or pre-loaded according to the user's preferences. In addition, the breech lock coupling may be disassembled for inspection and maintenance and reassembled. A locking ring secures two coupling components together. The coupling components may be attached to opposite ends of the riser sections, such as via welding. The locking ring may be pre-attached to the first coupling component for easy storage and fast assembly. Assembly of the riser may be accomplished by inserting the second coupling component into the locking ring and the first coupling component, then rotating the locking ring with respect to the second component. Furthermore, the coupling may be pre-loaded by tightening fasteners on the locking ring to provide a more stable coupling. Unlike with traditional riser couplings, the pre-load fasteners may be tightened via hand-held tools.

What is needed is a breech lock coupling comprising a ferrule locking to a connector with a breech lock connection, and the ferrule locking directly to a stem by crimping or swaging the ferrule to the stem. The present invention meets this need.

SUMMARY OF THE INVENTION

The primary aspect of the invention is to provide a breech lock coupling comprising a ferrule locking to a connector with a breech lock connection, and the ferrule locking directly to a stem by crimping or swaging the ferrule to the stem.

Other aspects of the invention will be pointed out or made obvious by the following description of the invention and the accompanying drawings.

The invention comprises a breech lock coupling comprising a stem receivable in a hose, a ferrule configured to receive the stem and hose, a connector, the ferrule comprising a plurality of ferrule lugs on an inner surface, each ferrule lug separated from an adjacent ferrule lug by a ferrule lug gap, the connector comprising a plurality of connector lugs on an outer surface, each connector lug separated from an adjacent connector lug by a connector lug gap, each ferrule lug gap arranged to receive a connector lug and each connector lug gap arranged to receive a ferrule lug upon engagement of the ferrule with the connector, each connector lug axially alignable with a ferrule lug upon rotation (R) of the connector within the ferrule, the connector engages a stem end, a fastener for fixing a connector position relative to the ferrule.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a cross-sectional view of the coupling.
FIG. 2 is a cross-sectional view of the stem.

DETAILED DESCRIPTION OF THE PREFERRED EMBODIMENT

Figure 3:
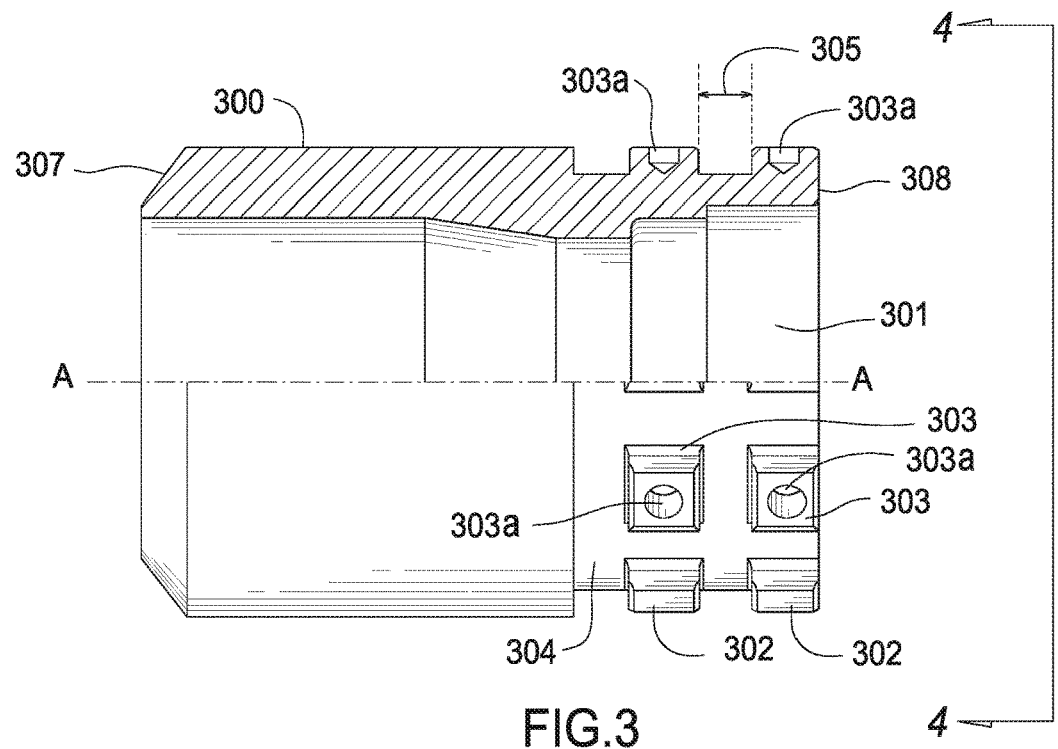
FIG. 3 is a cross-sectional view of the connector.

FIG. 1 is a cross-sectional view of the coupling. Coupling 1000 comprises stem 100, ferrule 200 and connector 300. Coupling 1000 is used as an end assembly for flexible hose, such as for hydraulic, industrial, oil and gas and the like.

Stem 100 is cylindrical. Stem 100 comprises a plurality of serrations 101, annular protrusions 102 and annular protrusions 103 each projecting outward from an exterior surface. Protrusions 102 engage and retain the hose wire reinforcement.

Serrations 101 extend around the outer circumference of the stem in annular fashion. Protrusions 102 and protrusions 103 extend around the outer circumference of the stem. Serrations 101 and protrusions 102 may comprise any suitable profile for gripping or clamping a hose.

Ferrule 200 is cylindrical having a plurality of serrations 201, annular protrusions 202 and annular protrusions 203 on an interior surface. Serrations 201 extend around the inner circumference of the ferrule in annular fashion. Protrusions 202 and protrusions 203 extend around the inner circumference of the ferrule. Serrations 201, protrusions 202 and protrusions 203 may comprise any suitable profile. Protrusions 202 cooperate with protrusions 102 to grip the hose wire reinforcement the coupling ferrule has been crimped or swaged. Protrusions 203 mechanically engage between protrusions 103 once the coupling ferrule has been crimped or swaged thereby mechanically locking stem 100 into ferrule 200.

End 204 comprises ferrule lugs 205. Each ferrule lug 205 extends radially from an inner surface 206 of ferrule 200. Each ferrule lug 205 has a substantially rectangular shape. Ferrule lugs 205 are arranged in an adjacent row, or rows, with a gap 207 between adjacent ferrule lugs. Ferrule lugs 205 are arranged in single file in the axial direction A-A with a gap 208 between adjacent ferrule lugs. A single row or multiple rows of ferrule lugs 205 can be used depending upon the axial force exerted on the coupling by the particular service.

End 301 of connector 300 engages an end 204 of ferrule 200. Connector 300 also engages end 104 of stem 100. End 301 of connector 300 comprises a male portion while end 204 of ferrule 200 comprises a female portion. End 104 of stem 100 comprises the male spigot portion of a bell and spigot style joint while receiving portion 301 of connector 300 comprises the female bell portion of a bell and spigot style joint.

FIG. 2 is a cross-sectional view of the stem. Protrusion 203 engages between adjacent protrusions 103 on stem 100 upon crimping or swaging of end 204. Protrusions 202 cooperate with protrusions 102 to retain a hose H therebetween upon crimping or swaging of portion 212. Hose H abuts surface 110. Connector 300 abuts surface 111.

FIG. 3 is a cross-sectional view of the connector. End 301 comprises connector lugs 302 and 303. Each connector lug 302 and 303 extends radially from an outer surface 304 of connector 300. Each connector lug 302 and 303 has a substantially rectangular shape. Connector lugs are arranged in adjacent rows with a gap 305 between each adjacent connector lug. Connector lugs 302, 303 are arranged in single file in the axial direction A-A as well with a gap 306 between each adjacent connector lug. Each connector lug portion 303a receives a fastener 209 to attach the connector to the ferrule. Surface 308 abuts surface 111.

Figure 4:
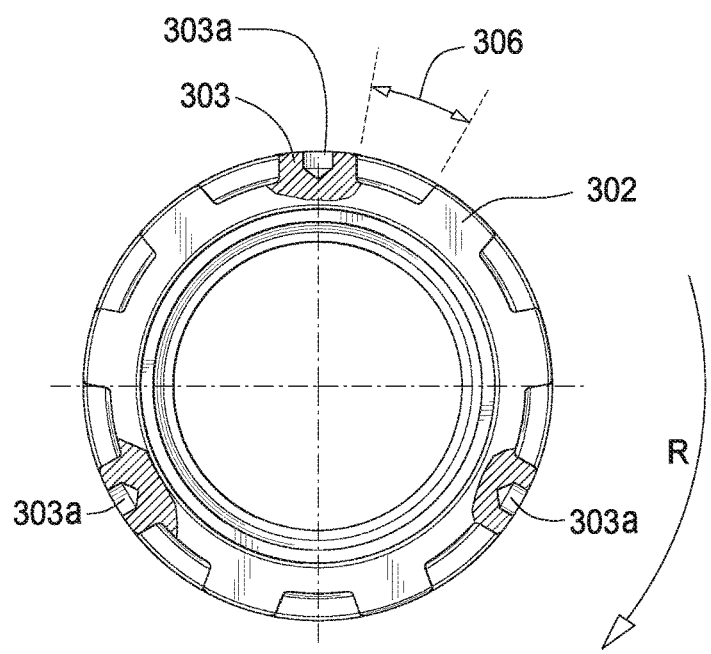
FIG. 4 is a detail of FIG. 3.

FIG. 4 is a detail of FIG. 3. During assembly each ferrule lug 205 engages a connector lug gap 306 as the connector is moved axially AM with respect to the ferrule. Each connector lug 302 or 303 engages a ferrule lug gap 208 as the connector is moved axially AM with respect to the ferrule. Gap 208 extends in an axial direction as a slot between lugs 205, see 206 FIG. 5. Each connector lug is axially alignable with a ferrule lug upon a rotation R of the connector within the ferrule. Rotation R of the connector can be in the range from greater than zero degrees to ninety degrees. For the instant embodiment the rotation R is approximately 20 degrees. The amount of rotation depends upon the number of lugs and corresponding gaps used around a circumference. The amount of rotation will correspond to the angular width of a lug. For example, for a total of eighteen lugs and gaps, the rotation angle will equate to: 360°/18 lugs and gaps=20°. The connection between the connector and the ferrule can also referred to as a breech lock connection.

The configuration of the coupling has further advantage because it allows a connector with a weld end to be constructed without the hose being adjacent to the heated zone of the connector during the weld. This preserves the integrity of the hose and reduces the chance of damage. In particular, connector 300 is first welded to a receiver (not shown). Separately, the hose H is crimped into the stem and ferrule. Once the weld has cooled the ferrule is engaged with the connector. The fasteners are then engaged after the ferrule is rotated with respect to the connector. Once secured the fasteners inhibit relative rotation of the connector and ferrule.

Figure 5:
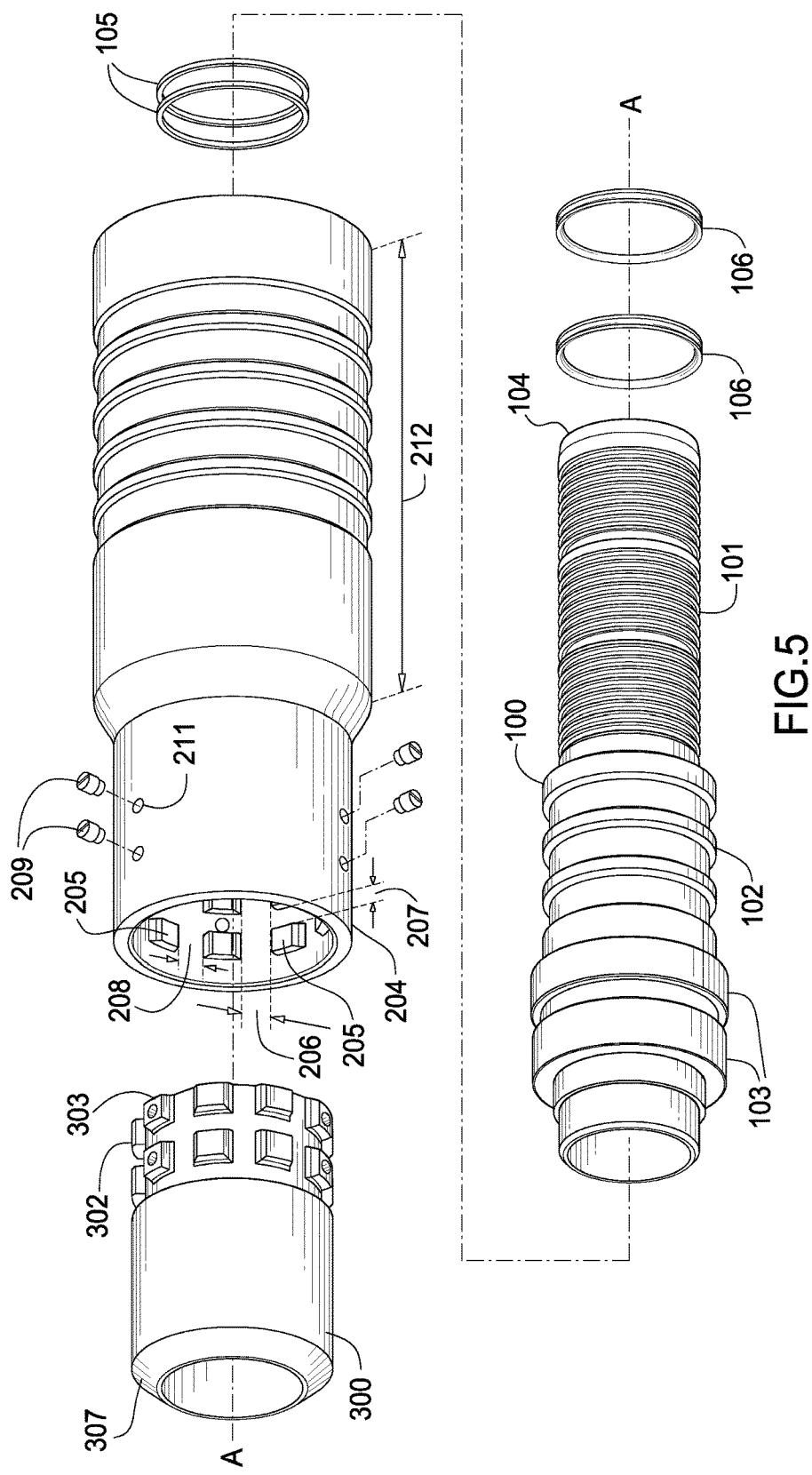
FIG. 5 is an exploded view of the coupling.

FIG. 5 is an exploded view of the coupling. Stem 100 is pressed into an end of a hose H until the hose abuts surface 110. O-ring and back up ring 106 seal between stem 100 and hose H.

End 301 of connector 300 is engaged with end 204 of ferrule 200 in the axial direction AM. This is accomplished by passing connector lugs 302 and 303 through ferrule lug gaps 208 along slot 206. In this position each connector lug 302, 303 aligns with a ferrule lug gap 207. Each ferrule lug 205 aligns with a connector lug gap 305. Connector 300 is then rotated whereby each ferrule lug 205 engages a connector lug gap 305 until each connector lug 303 aligns with a fastener hole 211. End 307 may comprise threads, a flange, weldment or other connection means according to the needs of a user.

Once hole 211 is aligned with lug portion 303a a fastener 209 is inserted through each hole 211 into each connector lug portion 303a. Fasteners 209 may comprise pins, dowels, screws, rivets, socket head screws or other suitable means. Once each fastener 209 in installed each connector lug is mechanically locked thereby preventing axial or rotational movement between ferrule 200 and connector 300.

The stem end 104 (with hose attached) is pressed into the ferrule until end 104 engages end 301 in a bell and spigot manner. Surface 111 abuts surface 308. O-rings 105 seal between end 104 and end 301. Portion 212 is then swaged or crimped down on the hose to provide compressive forces, sealing the hose against the stem and retaining the hose in the coupling.

Figure 6:
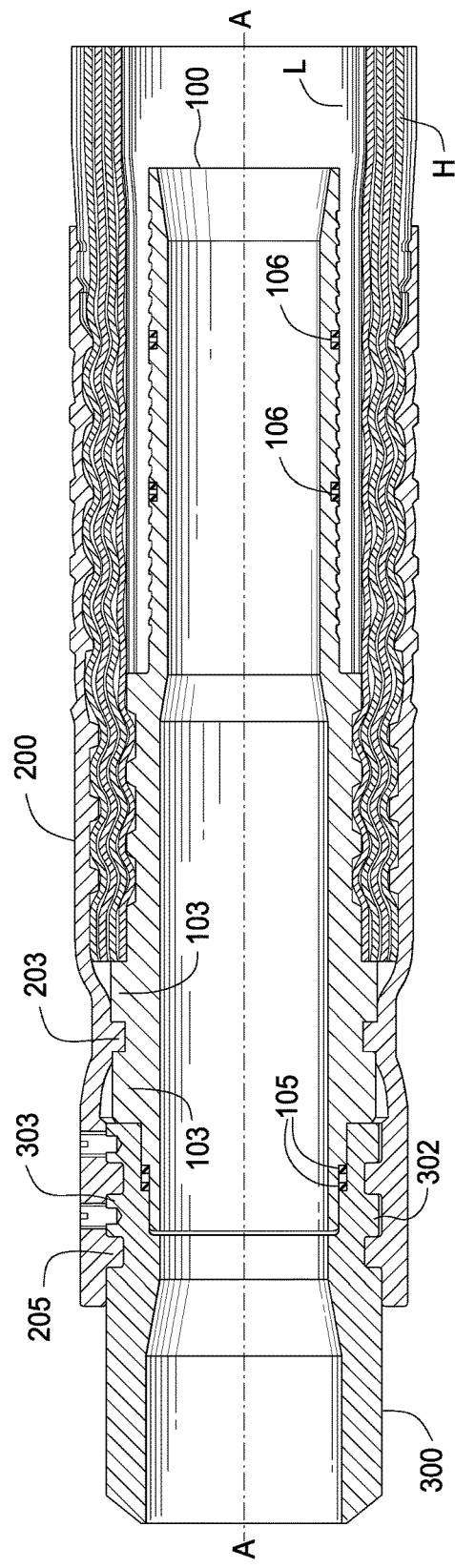
FIG. 6 is a cross-sectional view of the assembled coupling crimped on a hose.

FIG. 6 is a cross-sectional view of the assembled coupling crimped on a hose. Hose H is engaged with an outer surface of stem 100 and is retained between ferrule 200 and stem 100. Connector 300 is mechanically locked to ferrule 200 by the interlocked connector lugs 302, 303 and ferrule lugs 205. Stem 100 is also mechanically locked to ferrule 200 by protrusion 203 engaging between protrusions 103. Seals 106 seal against hose inner liner L. Seals 106 engage receiving channels in the outer surface of stem 100.

A breech lock coupling comprising a stem configured to engage a hose, a ferrule configured to receive the stem and hose, a connector, the connector engages a stem end opposite the hose, the ferrule mechanically locking to the connector with a breech lock connection, and the ferrule mechanically locking directly to the stem by crimping or swaging the ferrule.

Although a form of the invention has been described herein, it will be obvious to those skilled in the art that variations may be made in the construction and relation of parts without departing from the spirit and scope of the invention described herein.

We claim:

1. A breech lock coupling comprising:
a stem (100) receivable in a hose;
a ferrule (200) configured to receive the stem and hose;
a connector (300);
the ferrule comprising a plurality of ferrule lugs (205) on an inner surface, each ferrule lug separated from an adjacent ferrule lug by a ferrule lug gap (208);
the connector comprising a plurality of connector lugs (302, 303) on an outer surface, each connector lug separated from an adjacent connector lug by a connector lug gap (306);

each ferrule lug gap arranged to receive a connector lug and each connector lug gap arranged to receive a ferrule lug upon engagement of the ferrule with the connector;

each connector lug axially alignable with a ferrule lug upon rotation (R) of the connector within the ferrule;

the connector engages a stem end (104); and a fastener (209) for fixing a connector position relative to the ferrule.

2. The coupling as in claim 1 further comprising a seal between the stem and the connector.

3. The coupling as in claim 1 further comprising a seal between the stem and the hose.

4. The coupling as in claim 1, wherein the stem comprises stem serrations on an outer surface.

5. The coupling as in claim 4, wherein the ferrule comprises protrusions extending from an inner surface.

6. The coupling as in claim 1, wherein the stem end comprises a male end and the connector comprises a female end.

7. The coupling as in claim 1, wherein the ferrule lugs are aligned axially.

8. The coupling as in claim 1, wherein the connector lugs are aligned axially.

9. The coupling as in claim 1, wherein the ferrule comprises a hole for receiving the fastener, and the fastener is received in a connector lug.

10. The coupling as in claim 1, wherein the ferrule comprises an annular protrusion which mechanically locks with the stem upon the ferrule being crimped or swaged.

11. A breech lock coupling comprising:
   a stem to engage a hose, the stem further comprising a stem annular protrusion on an outer surface;
   a ferrule configured to receive the stem and hose, the ferrule further comprising a ferrule annular protrusion on an inner surface;
   a connector;
   the ferrule comprising a plurality of ferrule lugs on an inner surface, each ferrule lug separated from an adjacent ferrule lug by a ferrule lug gap;
   the connector comprising a plurality of connector lugs on an outer surface, each connector lug separated from an adjacent connector lug by a connector lug gap;
   each ferrule lug gap arranged to receive a connector lug and each connector lug gap arranged to receive a ferrule lug upon engagement of the ferrule with the connector;
   each connector lug axially alignable with a ferrule lug upon rotation (R) of the connector within the ferrule;
   the connector connects to a stem end;
   the stem annular protrusion and ferrule annular protrusion are mechanically lockable upon the ferrule being crimped or swaged; and
   a fastener for fixing a connector position relative to the ferrule.

12. The coupling as in claim 11 further comprising a seal between the stem and the connector.

13. The coupling as in claim 11 further comprising a seal between the stem and the hose.

14. The coupling as in claim 11, wherein the connection between the connector and the stem end is a bell and spigot style connection.

15. The coupling as in claim 11, wherein the ferrule lugs are aligned axially.

16. The coupling as in claim 11, wherein the connector lugs are aligned axially.

17. The coupling as in claim 11, wherein the ferrule comprises a hole for receiving the fastener, and the fastener is received in a connector lug.

18. A breech lock coupling comprising:
   a stem configured to engage a hose;
   a ferrule configured to receive the stem and hose;
   a connector configured to engage the ferrule, and to engage a stem end opposite the hose with a bell and spigot style connection;
   the connector locking to the ferrule with a breech lock connection; and
   the ferrule locking directly to the stem by crimping or swaging the ferrule to the stem.

19. The coupling as in claim 18 further comprising a fastener engaged between the ferrule and the connector.

20. The coupling as in claim 19 further comprising a seal between the connector and the stem.

\* \* \* \* \*